March 14, 1967 G. YANISHEVSKY 3,309,688

PULSE WIDTH FAULT DETECTION APPARATUS

Filed Dec. 3, 1963

INVENTOR.
GILBERT YANISHEVSKY

BY Carl Fissell Jr.
AGENT 3,309,688

PULSE WIDTH FAULT DETECTION APPARATUS

Gilbert Yanishevsky, Philadelphia, Pa., assignor to Burroughs Corporation, Detroit, Mich., a corporation of Michigan Filed Dec. 3, 1963, Ser. No. 327,785
13 Claims. (Cl. 340—248)

Figure 1:
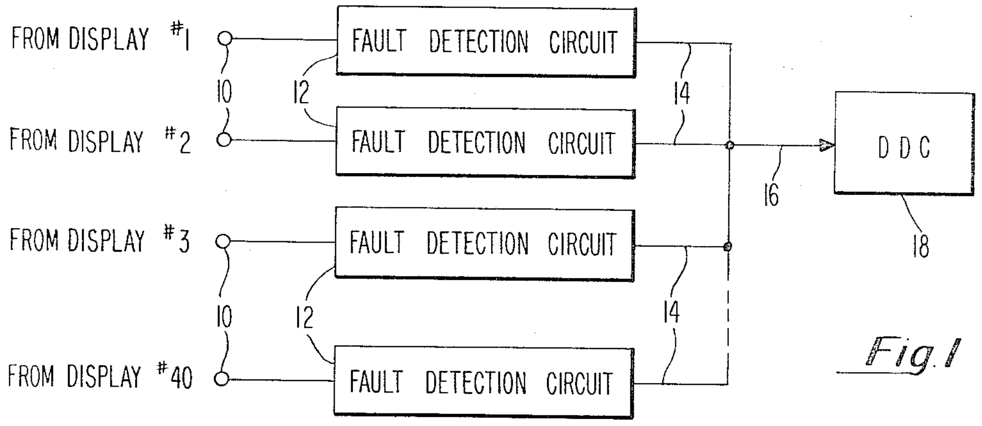

This invention relates to fault detection apparatus, and more particularly, although not necessarily exclusively, to solid state electron fault indicating and correcting circuitry. Still more specifically, the invention has to do with solid state fault detection circuitry especially adaptable to electronic systems utilizing large numbers of similar pieces of electrical apparatus such for example, as the control consoles of information display equipment wherein it is important to obtain an automatic response to, or an indication of, the failure of an individual circuit or console.

Still more specifically, the present invention has to do with fault detection circuitry and for preventing a malfunctioning circuit from interfering with the action of other circuits whose operation is normal.

The operation of the circuit of the invention may be compared to, although singularly different from, a so-called "slow-blow" fuse, i.e., a fuse that "blows" when an overload exists for longer than a specified safe time period. However, a fuse is not suitable for use in the system hereinafter described since it is not completely time dependable or accurate, must be replaced by hand and is not sensitive to varying time delays.

Electromagnetic relays have been employed in particular circuits but their operation is relatively slow, too slow for the system operation herein described.

It is an important object therefore of the present invention to provide apparatus which solves the foregoing and other similar problems in a new and novel manner.

Another object of the invention is to provide a fault detection circuit which is fast in operation and recovery after operation.

It is also an object of the invention to provide a relatively inexpensive fault detection circuit utilizing standard, readily obtainable components.

Still a further object of the invention is the provision of solid state electron automatically actuatable fault detection apparatus offering extremely high reliability with a minimum number of components.

In accordince with the foregoing objects and first briefly described herein, the present invention relates to electronic fault detection apparatus comprising solid state input signal means to which pulses of a predetermined time interval are applied. Output means is provided for selectively reproducing the input signal at the output means. Sawtooth generator means are provided for generating a voltage waveform for the time period during which the pulse is applied to the input means. Delay means actuated by the sawtooth wave is provided for selectively inhibiting the output means when a signal of greater than the predetermined interval occurs and reset means are included for establishing the normal preset condition.

Further, in accordance with these objects another important feature of the invention comprises a fault detection system wherein a plurality of parallel input lines having signals of a predetermined duration applied thereto are interconnected to a single output line. Electrical circuit means is provided for sequentially interconnecting a selected input line with the output line. Pulse width sensitive fault detection means in series with each input line provides means whereby when a signal of greater than the predetermined duration occurs on an input line, that input line is automatically isolated from the output line.

Figure 2:
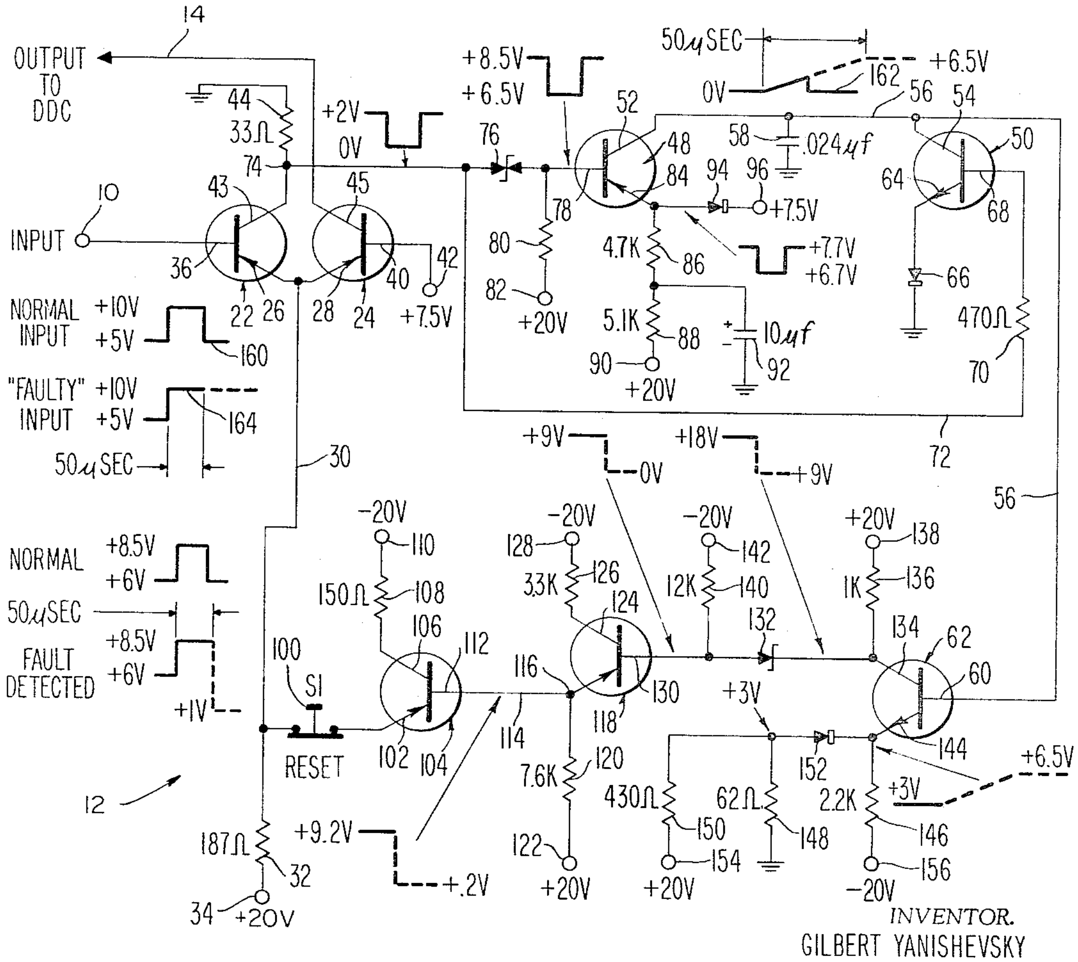

Other features and aspects of the invention are defined in the appended claims. The invention however, will be better understood from the following description taken in conjunction with the accompanying drawings in which:

FIGURE 1 shows a block diagram of the circuit arrangement for the input portion of the apparatus; and FIGURE 2 is a schematic circuit diagram of fault detection circuitry embodying the invention.

The fault detection circuit involving the present invention is designed to prevent a malfunctioning electrical circuit or circuits from interfering with the action of other associated circuits whose operation is normal. The detection circuit is activated by an electrical impulse, the time duration of which represents the period of time during which another electrical circuit is electronically connected to the circuit being protected.

A preferred embodiment of the invention has been illustrated in FIGURES 1 and 2 but it is to be understood that variations in and slight departures from the described circuit are considered to be within the purview of the invention as herein claimed.

As seen in FIGURE 1 a plurality of display devices, e.g., forty display consoles (numbered 1–40 inclusive) are interconnected via individual lines 10, fault detection circuits 12, and lines 14 as to drive a common line 16. Only one such display device drives the common line 16 at any specified time interval. The output of the common line 16 is fed to a data display controller 18 in a conventional manner. The device 18 is or may be a cathode ray tube. If for any reason one of the display devices 1–40 were to break-down, or malfunction, the CRT deflection circuit of the apparatus (if the fault detection circuit of the present invention were not used) might "load down" the common line to such an extent that the remaining display consoles could not adequately and properly drive the common line thereby causing the entire system to cease operating satisfactorily. With the fault detection circuit 12 connected to each display console line 10, a malfunctioning display device is electronically, automatically disconnected from the common line 16 fast enough to prevent damage, but permitting the remaining display devices to operate quite normally. Once removed the defective display device remains "out of circuit" until normally reset after the malfunction is eliminated.

In the present display system, a display device can supply digital information for a maximum of 50 microseconds, after which time the fault detection circuit disconnects the display from the line. If the display sends an information pulse to the common line for less than 50 microseconds there is no malfunction, and the fault detection circuit quickly resets itself for the next sampling. The time required for the circuit to reset is in the order of 0.5 microsecond.

Referring now in detail to FIGURE 2 wherein fault detection apparatus 12 incorporating the present invention is shown, it is seen that a pair of solid state electron devices, e.g., transistors 22 and 24 have their emitters 26 and 28 tied together to a common line 30 providing a positive bias potential through load resistor 32 by means of the plus 20 volt source 34. The potential on line 30 follows the base of transistor 22 or 24 depending upon which is the more negative. The difference between this voltage on line 30 and the +20 volt supply determines the current on line 30. The base 36 of transistor 22 is connected to a terminal identified as input 10, for application thereto of a source of positive signal potential which may vary as before mentioned, e.g., both as to amplitude and duration as will hereinafter be described more fully.

The base 40 of transistor 24 is biased less positively than that of transistor 22 by connection to a source of positive 7.5 volt potential 42. The base 40 is thus biased at a potential (+7.5 volts) which is directly in between the input signal voltage which runs from +5 to +10 volts. The collector 43 of transistor 22 is connected to ground via a resistor 44. The collector 45 of transistor 24 is connected to a line 16 identified as output to D.D.C.

A second pair of transistors 48 and 50 have their collectors 52 and 54 respectively, tied together via a common line 56 which is by-passed to ground via capacitor 58. The extension of line 56 is connected to the base 60 of transistor 62. The emitter 64 of transistor 50 is connected to ground through a diode 66. The base 68 of this transistor is connected through resistor 70 and lead 72 to the junction 74 between the collector 43 of transistor 22 and resistor 44.

A 6.5 volt, double anode Zener diode 76 interconnects the base 78 of transistor 52 with the collector 43 of transistor 22 via one end of the line 72. A load resistor 80 is used to apply a positive potential to the base 78 from a +20 volt source 82 thereby providing translation current for Zener diode 76. The emitter 84 of transistor 48 is biased positively by means of two series connected load resistors 86 and 88 connected to a source of positive potential 90. Resistor 88 is by-passed to ground by way of the capacitor 92. A diode 94 is connected from a low positive 7.5 volt potential source 96 to the junction of resistor 86 and emitter 84. The emitter 84 follows either the base 78 or the cathode of diode 94 depending upon which is more negative. The amount of current is the difference between the +20 volt supply and the voltage on emitter 84 divided by the resistance value of resistors 86 and 88.

A reset switch 100 further identified as S1 is interposed between one end of the resistor 32 and the emitter 102 of transistor 104. The collector 106 of transistor 104 is connected via load resistor 108 to a negative 20 volt source of potential 110. The base 112 of this transistor is connected via line 114 to the emitter 116 of transistor 118, the latter being biased positively via load resistor 120 connected to a positive 20 volt potential source 122. Load resistor 120 has no effect upon the emitter voltage of transistor 118 since it is an emitter follower. Collector 124 is connected via resistor 126 to a 20 volt negative potential source 128. The base 130 is electrically coupled through a 9 volt Zener diode 132 to the collector 134 of transistor 62, the latter element being positively biased through resistor 136 by connection to a positive 20 volt source of potential 138. The anode of Zener diode 132 is negatively biased through resistor 140 connected to a negative 20 volt potential 142. The emitter 144 of transistor 60 is connected as a switch to the cathode of diode 152 and to a set of three resistors 146, 148, and 150. The opposite end of resistor 148 is grounded. Resistors 146 and 148 are interconnected by means of diode 152. A positive 20 volt potential from source 154 is applied to resistor 150 while a negative potential of 20 volts is applied to resistor 146 from source 156. Resistors 148 and 150 provide a reference voltage to the anode of diode 152. Resistor 146 is used to provide a current source to switch from the anode of diode 152 to transistor 62 when line 56 becomes more positive than the anode of diode 152.

The waveforms hereinafter identified and described are utilized to show both the normal and abnormal or "fault" conditions. Waveforms illustrated in solid line form indicate operation when the input signal is normal. Waveforms shown in dotted or broken outline form indicate circuit conditions when a "fault" has been detected. A positive input pulse that rises from +5 to +10 volts and then returns to +5 volts in less than 50 microseconds is considered normal. However, if the input waveform remains at the 10 volt level for more than 50 microseconds, the input line is automatically isolated from the faulty circuitry by turning off transistor 24. In other words, should the input waveform remain at +10 volts for longer than 50 microseconds, the output line is completely isolated by turning "off" transistor 24 and turning "on" transistor 104.

In normal operation of the present invention and with no pulse applied to the input 10, the circuit of FIGURE 2 has the following standby conditions prevailing. The base 36 of transistor 22 rests at +5 volts and the transistor conducts. Current flows from the +20 volts supply 34 through resistor 32, transistor 22 and resistor 44 causing the emitter 26 to be at +6 volts, and the collector 43 to be at +2 volts. The emitter 28 of transistor 24 is also +6 volts so that transistor 24 is non-conducting, i.e., "off." Current also flows from the +20 volt supply 82 through resistor 80, Zener diode 76 and resistor 44 at all times. Zener diode 76 functions to provide a transformation, or level shift of 6.5 volts. Thus, since the collector 43 of transistor 22 is at +2 volts, the emitter of transistor 22 is at 8.5 volts. Current flowing from the +20 volt supply 90 through resistors 88 and 86 and diode 94 to +7.5 volts causes the emitter 84 to be clamped at 7.7 volts. Since the base 78 of the transistor is more positive than its emitter, transistor 48 is turned off.

The +2 volt potential on the collector 43 of transistor 22 is applied through resistor 70 to the base 68 of NPN transistor 50 causing it to conduct. The collector 54 is now close to ground potential, and capacitor 58 is essentially uncharged. Current flowing from the +20 volt supply 154 through resistors 150 and 148 causes the anode of diode 152 to be always at a +3 volt potential. The current through diode 152 and resistor 146 causes the base 60 of transistor 62 to follow the voltage across capacitor 58. With emitter 144 at 2.8 volts and the base 60 at 0 volts, the transistor 62 is non-conducting, i.e., "off." The collector 134 of transistor 62 is at +18 volts, due to current flow from the +20 volt supply 138 through resistor 136, Zener diode 132 and resistor 140 to the negative supply −20 volts 142. Zener diode 132 has a constant voltage drop of 9 volts. Since the collector 134 of transistor 62 is at +18 volts, the base 130 of transistor 118 is at +9 volts.

Transistor 118 is connected in an emitter-follower fashion, with current constantly flowing from the +20 volt supply 122 through resistor 120, through the transistor 118, the resistor 126 to the −20 volt supply 128. Thus the base 130 of transistor 118 at +9 volts, its emitter 116 is at +9.2 volts. Thus, under the foregoing conditions the base 112 of transistor 104 is at +9.2 volts, while the emitter 102 is at +6 volts. Therefore, transistor 104 is not conducting or off and so that does not effect the potential at the bases 36 and 40 or emitters 26 and 28 of transistors 22 and 24 respectively.

Assume now that an input pulse 160 is applied to transistor 22 from input 10. The base 36 rises to +10 volts. If this applied pulse 160 is less than 50 microseconds in duration, normal conditions exist, and the fault detection circuitry has no effect on transistor 24. The circuits react as follows: when the normal input pulse 160 causes the base 36 of transistor 22 to go to +10 volts, transistor 22 is non-conducting, i.e., turned off. Resistor 44 causes collector 43 to go towards ground potential, the constant voltage drop through Zener diode 76 causes the base 78 of transistor 48 to drop +6.5 volts. The emitter 28 of transistor 24 goes to +8.5 volts and transistor 24 conducts. The base 78 of transistor 48 is now more negative than its emitter 84, causing transistor 48 to conduct. The emitter 84 drops to +6.7 volts, while the collector 52 starts to rise toward +6.5 volts. Current flowing from collector 52 to ground through capacitor 58, charges the same, generating a "ramp" waveform 162. If the input pulse 160 to transistor 22 does not exceed 50 microseconds in width, the collector 52 of transistor 48 never reaches +6.5 volts, and transistor 62 never conducts, i.e., is never turned on. Therefore transistors 62, and 104 remain in their non-conducting or off state. When the input pulse 160 goes back to +5 volts, the emitter 26 of transistor 22 goes to +6 volts while the base of transistor 24 remains at +7.5 volts. The collector 43 of transistor 22 returns to +2 volts and transistor 24 is also cut off.

With transistor 48 cut off, capacitor 58 would normally discharge very slowly. A fast discharge function is provided by transistor 50 when the collector 43 of transistor 22 is at +2 volts. Current flows from collector 43 through resistor 70, transistor 50 and diode 66 to ground. With transistor 50 conducting the collector 54 tends to go to ground potential, causing capacitor 58 to discharge rapidly through transistor 50 and diode 66 to ground. As soon as capacitor 58 has completely discharged, the fault detection circuitry is ready to accept another input pulse.

Should a malfunction occur in the circuit or circuits being monitored, then it appears to the fault detection circuit as a pulse having a width exceeding 50 microseconds. In this case the fault detection circuitry operates as follows: the input pulse 164 turns transistor 22 off, i.e., it becomes non-conductive, thus turning on transistors 48 and causing capacitor 58 to start charging. After 50 microseconds, capacitor 58 has become charged to the point where the potential on the base 60 of transistor 62 is sufficiently positive, about +3 volts, to cause transistor 62 to conduct. When the base 60 has risen to about +3.2 volts, its emitter 144 has also risen to +3.0 volts, and the voltage on its collector 134 has dropped to +9 volts. The action of Zener diode 132 causes the +9 volts on the collector 134 of transistor 62 to appear as zero (0) volts to the base 130 of transistor 118. Its emitter 116 accordingly drops to +0.2 volts.

The base 112 of transistor 104 is now at +0.2 volts causing transistor 104 to conduct heavily. Current flows from the +20 volts supply 34 through resistor 32, through transistor 104 and resistor 108 to the −20 volt supply 110. This action causes the emitter 102 of transistor 104, and therefore the emitters 26 and 28 of transistors 22 and 24 to drop to approximately +1 volt. With the emitters 26 and 28 at +1 volt, transistors 22 and 24 cannot be turned on again, regardless of whether the input voltage to transistor 22 is at +5 or +10 volts. Since transistor 22 cannot be turned on, transistor 24 cannot conduct and the faulty circuit will not be able to affect the operation of the rest of the system. The fault detection circuit can be reset by turning it off (removing power) and turning it on again, or by opening switch S1 (100) momentarily. Switch 100 is normally closed as seen in FIGURE 2.

When the fault detection circuitry is first energized, it is necessary to make certain that transistor 62 has both the proper voltages applied to it to keep non-conducting or cut off or else, conduction or transistor 62 may prevent transistor 22 from ever being turned on. The problem is avoided by a time delay provided by capacitor 92 charging through resistor 88. Transistor 48 is not permitted to conduct until capacitor 92 has become fully charged. This time delay keeps the emitter 84 of transistor 48 minus and the base 60 of transistor 62 close to ground potential thereby assuring the transistor 62 will not conduct during the turn-on procedure.

In the drawing the waveforms shown as solid lines indicate normal operating conditions while the waveforms illustrated in dotted lines indicate circuit conditions when a "fault" has been detected.

What is claimed is:

1. Pulse width fault detection apparatus comprising:
(a) a source of signal pulses of predetermined duration and width;
($a^1$) input solid state means to which said pulses of predetermined width are applied from said source of pulses;
(b) means for selectively reproducing the input signal pulses at an output line directly coupled thereto;
(c) means for generating a voltage waveform for the time period during which a pulse is applied to said input means;
(d) means actuated by said voltage waveform for selectively inhibiting said output means when a signal of greater than the predetermined time duration and width occurs; and
(e) means for re-establishing the original circuit condition.

2. Pulse width fault detection apparatus comprising:
(a) input solid state means to which pulses of a predetermined time duration and width may be applied from a source of pulses;
(b) output means for selectively reproducing the input signal pulses at an output line directly coupled thereto;
(c) ramp generator means for generating a voltage waveform for the time period during which a pulse is applied to said input means;
(d) means actuated by the voltage waveform for selectively inhibiting said output means when a signal of greater than the predetermined width occurs; and
(e) reset means for re-establishing the original circuit condition.

3. Pulse width fault detection apparatus comprising:
(a) input solid state means to which pulses of a predetermined time duration and width may be applied from a source of pulses;
(b) output means for selectively reproducing the input signal at an output line directly coupled thereto;
(c) saw-tooth generator means for generating a voltage waveform for the time period during which a pulse is applied to the input means;
(d) delay means actuated by said saw-tooth wave for selectively inhibiting said output means when a signal of greater than the predetermined width occurs; and
(e) reset means for establishing the original circuit condition.

4. Pulse width fault detection apparatus comprising:
(a) input solid state means to which pulses of a predetermined time width may normally be applied from a source of pulses;
(b) output means for selectively reproducing the input signal at an output line directly coupled thereto;
(c) capacitor generator means for generating a voltage waveform for the time period during which the pulse is applied to the input means;
(d) delay means actuated by said voltage waveform for selectively inhibiting the output means when a signal of greater than the predetermined width occurs; and
(e) reset means for establishing the original circuit condition.

5. Pulse width fault detection apparatus comprising:
(a) a plurality of data display devices,
(b) a data display controller,
(c) means adapted for automatically disconnecting a selected one of said data display devices from said controller,
(d) said last means including pulse width sensitive means in the circuit line of each of said data display devices, effective in the event a signal of greater than a predetermined duration is applied to said controller from said display devices to automatically isolate and temporarily disconnect the defective display device from said controller, and
(e) means to reset said pulse-width sensitive means to the original condition.

6. Pulse width fault detection apparatus comprising:
(a) a data display controller,
(b) one or more parallel input lines,
(c) means connected to said input lines providing signals of a predetermined duration and width to said lines, (d) an output line adapted to supply data to said display device;
(e) means adapted for automatically disconnecting the selected input line from said output line, and
(f) said disconnecting means including pulse width sensitive fault detection means connected in series with each input line effective in the event a signal of greater than a predetermined duration and width occurs on an input line to automatically isolate and thereby disconnect that input line from the output line and thus from the display controller.

7. Pulse width fault detection apparatus comprising:
(a) input transistor means to which pulses of a predetermined time duration and width are applied from a source of pulses;
(b) means adapted for selectively reproducing each of the input signal pulses at an output line directly coupled thereto;
(c) capacitor charging means for generating a voltage waveform for the time period during which each pulse is applied to the input means;
(d) means establishing a predetermined level of potential at which said apparatus is operative to isolate said output from said input;
(e) a comparator for comparing the input signal pulse level with said predetermined level;
(f) means actuated by said voltage waveform for selectively inhibiting the output means when a signal of greater than the predetermined width occurs; and
(g) reset means for establishing the original circuit condition.

8. Pulse width fault detection apparatus comprising:
(a) input transistor means to which input signal pulses of a predetermined time duration and width may normally be applied from a source of pulses;
(b) means adapted for selectively reproducing the input signal at an output line directly coupled thereto;
(c) current generator means for charging a capacitor thereby generating a voltage waveform for the time period during which the pulse is applied to the input means;
(d) means establishing a predetermined voltage level for said waveform;
(e) capacitor discharging means in circuit with said current generator means and said capacitor;
(f) a voltage comparator for comparing the input signal level with said predetermined voltage level;
(g) switch means actuated by said voltage waveform for selectively inhibiting the output means when a signal pulse of greater than the predetermined width occurs; and
(h) reset means for establishing the original circuit condition.

9. Pulse width fault detection apparatus comprising:
(a) an input line to which pulses of a predetermined pulse duration and width are adapted to be fed;
(b) current generating means connected to said input line;
(c) input potential means for initiating operation of said current generating means;
(d) means operably associated with said current generating means for generating a ramp of voltage each time a pulse is fed thereto from said input means;
(e) means for discharging said ramp generating means at the end of each pulse applied thereto,
(f) comparator means connected to said ramp generating means and including means providing a voltage reference level for said ramp generating means effective to sense when said reference level is attained or exceeded;
(g) means to amplify said output signal;
(h) an output adapted to be connected to a utilization device;
(i) latching means to switch said output signal into said output line;

(j) means interconnecting said comparator means and said output line switch means effective to inhibit said output line when a pulse of greater than said predetermined width causes said voltage level to be exceeded thereby disconnecting said utilization device from said fault detection apparatus; and
(k) reset means for restoring said fault detection apparatus to its original condition.

10. Pulse width fault detection apparatus comprising:
(a) an input line to which pulses of a predetermined width are adapted to be fed;
(b) current generating means connected to said input line;
(c) means operably associated with said current generating means for generating a ramp of voltage in response to each of said pulses fed thereto;
(d) means for discharging said ramp generating means at the termination of said pulses;
(e) comparator means connected to said ramp generating means and including voltage level reference means for said ramp generating means effective to sense when said voltage reference level is attained and exceeded;
(f) an output line adapted to be connected to a utilization device; and
(g) means interconnecting said voltage level sensing means and said output line effective to inhibit said output line when a pulse of greater than said predetermined width causes said voltage level to be exceeded thereby disconnecting said utilization device from said fault detection apparatus.

11. Pulse width fault detection apparatus comprising:
(a) an input line to which pulses of a predetermined width are adapted to be fed;
(b) solid state current generating means connected to said input line to which said pulses are fed;
(c) capacitive means operably associated with said current generating means for generating a ramp of voltage in response to the application thereto of each input pulse;
(d) solid state means for discharging said capacitive ramp generating means at the termination of each of said pulses;
(e) solid state comparator means connected to said ramp generating means and including voltage level reference means for said ramp generating means effective to sense when said voltage reference level is attained and exceeded;
(f) an output line adapted to be connected to a utilization device; and
(g) means interconnecting said voltage level sensing means and said output line effective to inhibit said output line when a pulse of greater than said predetermined width causes said voltage level to be exceeded thereby disconnecting said utilization device from said fault detection apparatus.

12. Pulse width fault detection apparatus comprising:
(a) an input line to which pulses of a predetermined width are adapted to be fed;
(b) transistor current generating means connected to said input line;
(c) a capacitor operably associated with said current generating means for generating a ramp of voltage each time a pulse is fed thereto from said input means;
(d) a transistor switch for discharging said ramp generating capacitor at the end of each pulse applied thereto;
(e) transistor comparator means connected to said ramp generating capacitor and including a resistor and a diode providing a voltage reference level for said ramp generating capacitor and being effective to sense when said reference level is attained or exceeded;

(f) an output line adapted to be connected to utilization device; and (g) means interconnecting said voltage level sensing means and said output line effective to inhibit said output line when a pulse greater than said predetermined width causes said voltage level to be exceeded thereby disconnecting said utilization device from said fault detection apparatus.

13. Pulse width fault detection apparatus comprising:

(a) an input line to which pulses of a predetermined width are adapted to be fed;

(b) transistor switch means in said input line;

(c) a transistor current generator connected to the emitter-collector circuit of said switch means;

(d) a capacitor operably associated with said current generating transistor for generating a ramp of voltage each time a pulse is fed thereto from said input means;

(e) a transistor switch for discharging said ramp generating capacitor at the end of each pulse applied thereto;

(f) a transistor comparator connected to said ramp diode providing a voltage reference level for said ramp generating capacitor and being effective to generating capacitor and including a resistor and a sense when said reference level is attained or exceeded;

(g) an output line adapted to be connected to a utilization device;

(h) a transistor switch in said output line, and (i) means interconnecting said voltage transistor level comparator and said output line switch effective to inhibit said output line when a pulse of greater than said predetermined width causes said voltage level to be exceeded thereby disconnecting said utilization device from said fault detection apparatus.

References Cited by the Examiner

UNITED STATES PATENTS

| | | | |
|---|---|---|---|
| 2,956,226 | 10/1960 | Vogt et al. | |
| 2,982,943 | 5/1961 | Isaacson et al. ---- | 340—248 X |
| 2,987,711 | 6/1961 | Palmer ------------ | 340—213 |
| 3,091,756 | 5/1963 | Lowman ----------- | 340—213 |

NEIL C. READ, *Primary Examiner.*

D. K. MYER, *Assistant Examiner.*